(12) United States Patent
Hafren (10) Patent No.: US 7,574,196 B2
(45) Date of Patent: Aug. 11, 2009

(54) METHOD AND A SYSTEM FOR CHARGING A STREAMING CONNECTION IN A MOBILE PACKET RADIO SYSTEM

(75) Inventor: Jonas Hafren, Helsinki (FI)

(73) Assignee: Nokia Corporation, Espoo (FI)

( * ) Notice: Subject to any disclaimer, the term of this patent is extended or adjusted under 35 U.S.C. 154(b) by 552 days.

(21) Appl. No.: 10/652,253

(22) Filed: Sep. 2, 2003

(65) Prior Publication Data

US 2004/0266391 A1 Dec. 30, 2004

Related U.S. Application Data

(60) Provisional application No. 60/483,136, filed on Jun. 30, 2003.

(51) Int. Cl.
*H04M 11/00* (2006.01)

(52) U.S. Cl. .................. 455/405; 455/412.1; 455/414.1

(58) Field of Classification Search ............... 455/406, 455/412.2, 414.1, 418, 419, 517, 411, 412.1, 455/414.2, 414.3, 432.3, 413, 414.4, 466; 705/30, 32, 40, 29; 709/228, 235
See application file for complete search history.

(56) References Cited

U.S. PATENT DOCUMENTS

| | | | | |
|---|---|---|---|---|
| 2001/0023416 A1* | 9/2001 | Hosokawa | .................... | 705/51 |
| 2002/0169868 A1* | 11/2002 | Lopke et al. | ................. | 709/224 |
| 2003/0078031 A1* | 4/2003 | Masuda | ....................... | 455/406 |
| 2003/0093545 A1* | 5/2003 | Liu et al. | ..................... | 709/231 |
| 2003/0101135 A1* | 5/2003 | Myatt et al. | .................... | 705/40 |
| 2003/0126237 A1 | 7/2003 | Tsuchiya | | |
| 2003/0143991 A1* | 7/2003 | Minear et al. | ................ | 455/419 |
| 2003/0154217 A1* | 8/2003 | Kinno et al. | ............. | 707/104.1 |
| 2003/0172165 A1* | 9/2003 | Xu et al. | ...................... | 709/228 |
| 2003/0216145 A1* | 11/2003 | Cox et al. | ................. | 455/456.1 |
| 2004/0268400 A1* | 12/2004 | Barde et al. | .................... | 725/94 |
| 2005/0108156 A1* | 5/2005 | Sumino et al. | ................ | 705/40 |
| 2006/0048669 A1* | 3/2006 | Kinno et al. | ................ | 104/100 |

FOREIGN PATENT DOCUMENTS

| | | |
|---|---|---|
| JP | 2003-152910 A1 | 5/2003 |
| JP | 2003-163918 A1 | 6/2003 |
| JP | 2003-167585 A1 | 6/2003 |
| WO | WO 02/084980 | 10/2002 |
| WO | WO 2004/036825 | 4/2004 |
| WO | WO 2004/036890 | 4/2004 |

OTHER PUBLICATIONS

Japanese Office Action, Japanese Patent Application No. JP 2006-518244, Drafting Date: Oct. 21, 2008, Mailing Date: Oct. 28, 2008, English Translation: pp. 1-3.
International Search Report, dated Sep. 3, 2004.

* cited by examiner

*Primary Examiner*—Alexander Eisen
*Assistant Examiner*—Dai A Phuong
(74) *Attorney, Agent, or Firm*—Mintz, Levin, Cohn, Ferris, Glovsky and Popeo, P.C.

(57) ABSTRACT

A method and a mobile packet radio system for charging a streaming connection are provided. According to one embodiment, the system includes a streaming source and a subscriber capable of receiving streaming data from the streaming source. According to another embodiment, the method includes the steps of establishing a data connection for the subscriber, establishing a streaming connection between the subscriber and the streaming source, terminating the streaming connection between the subscriber and the streaming source, and charging the streaming connection using a time-based charging.

2 Claims, 5 Drawing Sheets

METHOD AND A SYSTEM FOR CHARGING A STREAMING CONNECTION IN A MOBILE PACKET RADIO SYSTEM

CROSS-REFERENCE TO RELATED APPLICATIONS

This application claims priority of provisional patent application Ser. No. 60/483,136, filed Jun. 30, 2003, the entire contents of which are incorporated herein by reference.

BACKGROUND OF THE INVENTION

1. Field of the Invention

The invention relates to a method and a system for charging a streaming connection in a mobile packet radio system. In particular, the invention relates to charging streaming that is transmitted over a packet switched network.

2. Description of the Related Art

The growth of mobile communications and the Internet have spurred innovation and new technology in these areas, where the requirements of the modern day user are becoming more demanding. The boundaries between various traditional networks are becoming increasingly blurred. Nowadays, there is a significant overlap between applications traditionally in the telecommunications domain, i.e. circuit-switched traffic (voice) and applications traditionally in the data communication domain, i.e. packet-switched traffic (data). For instance, a mobile user forming part of the PLMN (Public Land Mobile Network) can now retrieve data from the Internet.

Thus, recently radio communication systems such as mobile communication networks have started to provide packet data services for the users in addition to traditional circuit switched services. Packet switched data service describes a type of service in which relatively small units of data called packets are routed through a network based on the destination address contained within each packet. In the following the terms packet switched and packet are used interchangeably unless otherwise noted. Breaking communication down into packets allows the same data path to be shared among a plurality of users in the network. This type of communication between a sender and receiver is commonly referred to as connectionless rather than dedicated. Most traffic over the Internet uses packet switching and the Internet is basically a connectionless network.

In a typical packet data enabled radio communication network a mobile station can send and receive packet data related to several different data connections simultaneously. A packet data traffic flow to a mobile station refers to the packet data corresponding to one or more simultaneous data connections to the mobile station. In the following the terms packet data traffic flow and traffic flow are used interchangeably unless otherwise noted. For example, packet data corresponding to an email message includes a data connection. Packet data corresponding to a World Wide Web (WWW) browsing session includes another data connection. When transmitted simultaneously to or from a given mobile station, these two data connections comprise a traffic flow. The two data connections can be in the same Packet Data Protocol (PDP) context.

Data services may be categorized into real time (RT) and non-real time (nRT) services. Non-real time services may include for example sending and receiving emails, and interactive browsing of the World Wide Web. Real time services may include for example streaming services such as multimedia and video transmissions. Traditionally real time services have mostly been implemented as circuit switched services but recently also real time packet data services have started to emerge.

An example of packet data service for digital mobile communication networks e.g. is the General Packet Radio Service (GPRS). The GPRS is designed to support especially digital mobile networks. These can be for example based on the GSM (Global System for Mobile Communications) standard. However, the GPRS is not restricted to only GSM networks but may support for example digital mobile networks based on Third Generation Partnership Project (3GPP) and Third Generation Partnership Project 2 (3GPP2) radio network standards. Additionally, the GPRS may also act as an access network for an IP Multimedia Subsystem (IMS).

A GPRS enabled mobile communication network includes two additional network elements or nodes. These include a Serving GPRS Support Node (SGSN) and a Gateway GPRS Support Node (GGSN). An SGSN typically delivers packets to GPRS enabled mobile stations (MS) within its service area. It may further send queries to a Home Location Register (HLR) to obtain profile data of GPRS subscribers. It may further detect new GPRS enabled mobile stations in a given service area, process registration of new mobile subscribers, and keep a record of their location inside a given area. The GGSN is typically used as an interface to external IP networks such as the Internet, other mobile service providers, GPRS services, enterprise intranets or streaming servers providing multimedia content.

In a packet-switched (PS, Packet Switched) mobile phone environment, it is possible to establish mobile originated (MO, Mobile Originated) connections, in which case a user or subscriber activates a PDP context (PDP, Packet Data Protocol) to the direction of the public land mobile network. After this, the transfer of information is successful from the terminal device to the public land mobile network and vice versa.

Typically GPRS networks utilize Wideband Code-Division Multiple Access (WCDMA) or GSM air networks. When the streaming service is implemented in these networks, charging the connections in the mobile packet radio systems is becoming more and more difficult for operators and end users to realize.

Currently there exists several ways of charging connections in mobile packet radio systems. Most of them are volume based or event based, this means that they are based on the measurement of the amount of information or bits that have been transferred through the system or a fixed fee for a certain event.

However, the GPRS standards allow time based charging to be applied on one Access Point Name, later referred to as APN. However, currently there does not exist a method for charging a streaming connection based on the length of a streaming connection or the time of the streaming connection simultaneously with a browsing or email session that is charged according to volume based charging.

SUMMARY OF THE INVENTION

According to one embodiment, the invention implements a time based charging mechanism for a streaming connection in a mobile packet radio system. Thus, one of the advantages is that the invention overcomes the lack of time based charging for streaming connections in mobile packet radio systems when there are simultaneously other connections in the system.

According to one embodiment, the invention discloses a method for charging a streaming connection in a mobile packet radio system, the system including a streaming source, a subscriber capable of receiving streaming data from the streaming source. The method includes the steps of: establishing a data connection for the subscriber, establishing a streaming connection between the subscriber and the streaming source, terminating the streaming connection between the subscriber and the streaming source, and charging the streaming connection using a time-based charging.

Furthermore, the invention discloses a mobile packet radio system for charging a streaming connection. The system includes a streaming source, a subscriber capable of receiving streaming data from the streaming source, means for establishing a data connection for the subscriber, means for establishing a streaming connection between the subscriber and the streaming source, means for terminating the streaming connection between the subscriber and the streaming source, and a charger for charging the streaming connection using a time-based charging.

According to another embodiment of the invention, a mobile packet radio system for charging a streaming connection is provided. The system includes a stream source and a subscriber capable of receiving streaming data from the streaming source. The system includes first establishing means, second establishing means, terminating means and a charger. The first establishing means establishes a data connection for the subscriber. The second establishing means establishes a streaming connection between the subscriber and the streaming source. The terminating means terminates the streaming connection between the subscriber and the streaming source. The charger charges the streaming connection using the time-based charging.

Some of the benefits of the invention are as follows. One advantage is that the invention provides a method and a system that overcomes the lack of time based charging for streaming connection. An end user or the subscriber of a mobile network has a sense of time. Therefore, it is easy for the subscriber to understand time based charging. By utilizing this time based charging provided by this invention the operators are able to charge for the streaming connection in an understandable way. Another benefit provided by this invention is that it makes it possible to charge a streaming connection based on used connection time in a situation where there is simultaneously a streaming connection and one or several other services, for example an email message or a browsing session.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
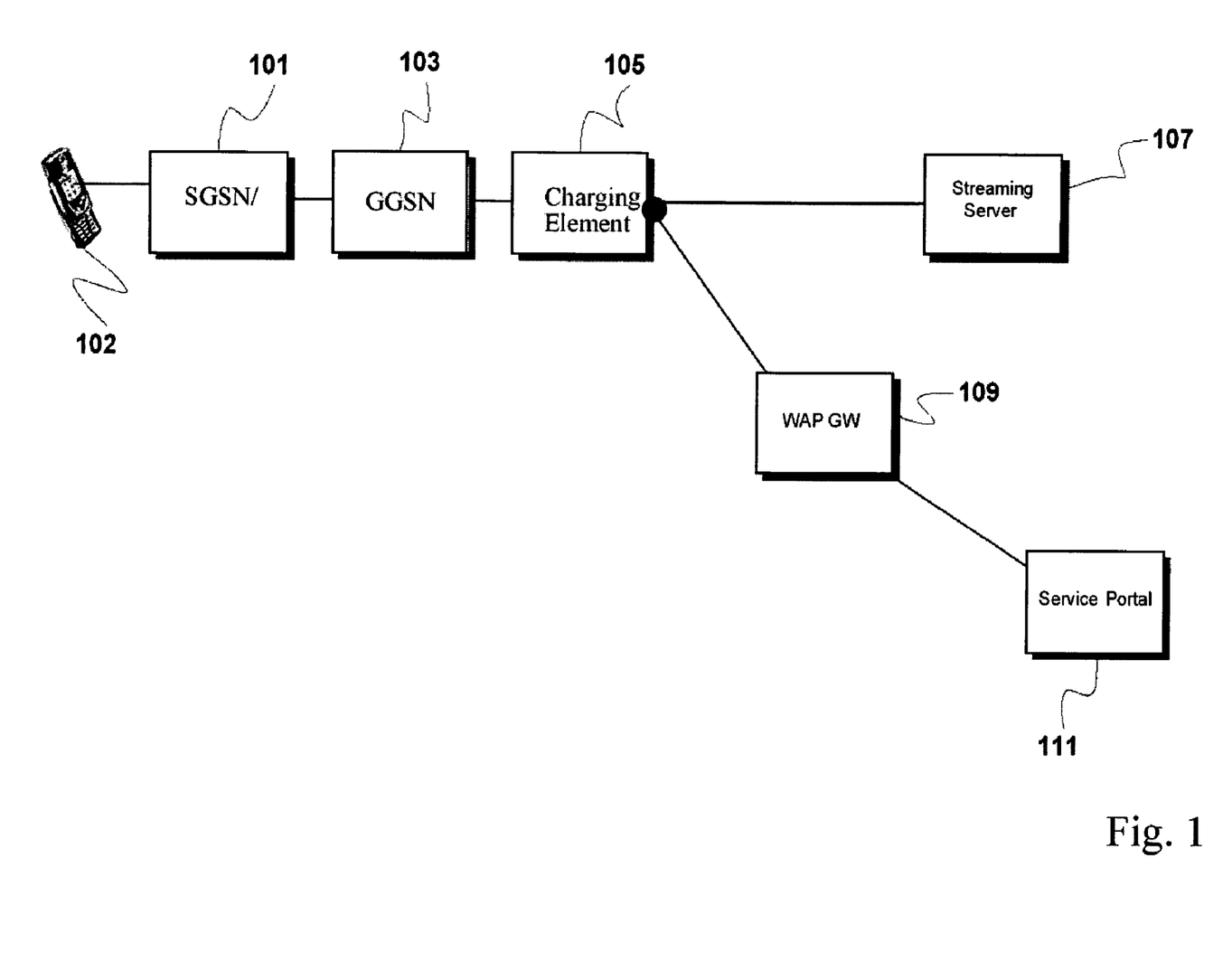
FIG. 1 shows a block diagram disclosing the general construction of a mobile packet radio system functioning in accordance with the invention.

FIG. 1 shows a block diagram disclosing the general construction of a mobile packet radio system functioning according to the invention. The mobile packet radio system can be e.g. a GPRS system. The block diagram shows a subscriber 102, which can be e.g. a mobile phone or mobile communicator, or other mobile subscriber equipment. In FIG. 1, the mobile packet radio system further includes a serving GPRS support node SGSN 101 and a gateway GPRS support node GGSN 103. In the inventive embodiment of the mobile packet radio system there is implemented a charging element 105. The charging element contains most of the components for implementing this invention. However, this inventive element or these inventive elements can be located in different parts of the mobile packet radio system, e.g. in connection with GGSN 103 or in connection with SGSN 101 or elsewhere in the system. The mobile packet radio network is connected to a streaming server 107 that is designed for sending streaming data or content to the client, e.g. to the mobile subscriber 102. The streaming data is sent through the network and the other network elements as shown in FIG. 1. According to an embodiment of the invention, the charging element supervises and follows the signalling used to build and disconnect streaming connections. Connected to the charging element or the respective other network elements (e.g. GGSN 103) is a WAP gateway WAP GW 109 that is connected to for example a service portal 111. The mobile packet radio system is capable of establishing a data connection between subscriber 102 and the streaming source which is implemented on e.g. one PDP context between the subscriber and the GGSN with a IP connection to the streaming source. The service portal is an example of a simultaneous browsing service through the same PDP context. The establishment of the data connection also means the authorization of the subscriber for the connection.

Furthermore, the mobile packet radio system is capable of establishing a streaming connection between subscriber 102 and streaming source 107, 111. The streaming connection is a continuous data connection between client, e.g. mobile subscriber 102 and a streaming source, e.g. a streaming server 107. The continuous data connection transfers e.g. video or multimedia content. The streaming connection is a transport layer virtual circuit established between two network elements or to or between programs for the purpose of communication. The establishment of a streaming connection has been described more accurately e.g. in the following document: H. Schultzrinne et A. Rao Real Time Streaming Protocol (RTSP) Network Working Group, April 1998.

Figure 2:
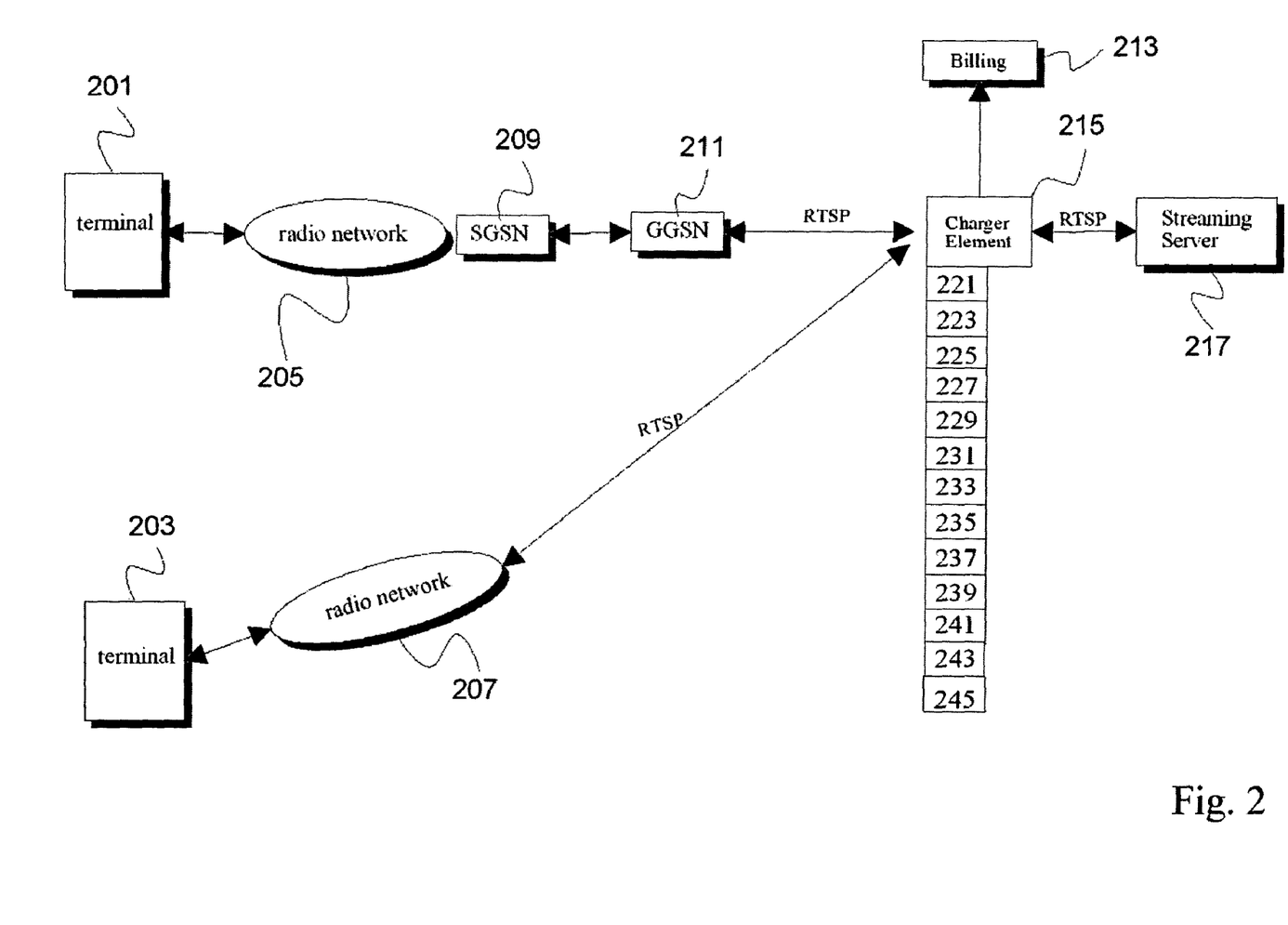
FIG. 2 shows a block diagram showing the elements of a mobile packet radio system in accordance with the invention.

FIG. 2 shows a block diagram illustrating the elements of an inventive mobile packet radio system. In FIG. 2 a mobile subscriber 201, e.g. a mobile terminal, is connected to a radio network 205 which is further connected to a serving GPRS support node 209 that is further connected to a gateway GPRS support node 211. RTSP protocol is used for streaming signalling and disclosed more accurately in the aforementioned publication. In connection with the gateway GPRS support node 211 in this embodiment there is a charger element 215. Charger element 215 is the charger for charging the streaming connection using a time based charging scheme. Charger or charging element 215 is further connected with a billing system 213 of the mobile packet radio system or other billing system 213 capable of billing subscribers for streaming connections. Charger element 215 is also connected to a streaming server 217.

Charging element 215 is also able to read RTSP protocol between the streaming server and the terminal which are connected through the radio network 207.

FIG. 2 discloses a mobile packet radio system for charging a streaming connection. The system includes a streaming source 217, a subscriber 201, 203 capable of receiving streaming data from the streaming source 217, devices 209, 211, 215, 217 for establishing a data connection for the subscriber, devices 209, 211, 217 for establishing a streaming connection between the subscriber 201 and the streaming source 217, devices 209, 211, 201, 217 for terminating the streaming connection between the subscriber and the streaming source, and a charger 215 for charging the streaming connection using a time-based charging.

Charger 215 includes a device 221 for measuring the length of the streaming connection, and a generator 223 responsive to the length for generating charging information. Charger 215 also includes device 221 for measuring the length of the streaming connection which includes a first identifier 225 for identifying the start and the end of the streaming connection based on a change of a state of the streaming connection.

In the mobile packet radio system shown e.g. in FIG. 2, device 221 for measuring the length of the streaming connection include a recognizing device 227 for recognizing the start and the end of the streaming connection, and a timer 229, responsive to the recognizing device 227, for measuring the length of the streaming connection.

In one embodiment of the invention, the recognizing device 227 is arranged to recognize the start or the end of the streaming connection by recognizing respectively one or several of the following messages: a play message, a teardown message and/or a disconnect message.

In one embodiment of this invention, the system includes a time stamps generator 231 for generating time stamps in response to messages sent by the subscriber. This kind of a mobile packet radio system includes a calculator mechanism 233, responsive to the time stamps generated by the time stamps generator 231, for calculating the length of the streaming connection. This length is measured most often in time, but also other measurement attributes and units are possible.

In the mobile packet radio system time stamps generator 231 is arranged to recognize a start of the streaming connection. Time stamps generator 231 is further arranged to create a first time stamp indicating the start time of the streaming connection. Time stamps generator 231 is further arranged to recognize the end of the streaming connection. Time stamps generator 231 is further arranged to create a second time stamp indicating the end of the streaming connection.

The system is in response to the first and the second time stamp arranged to calculate the length of the streaming connection.

Time stamp generator 231 is arranged to recognize the start and/or the end of the streaming connection by recognizing respectively one or several of the following messages: a play message, a teardown message and/or a disconnect message.

In one embodiment of the invention, device 221 for measuring the length of the streaming connection includes a second identifier 235 for identifying a temporary stop of the streaming connection in response to a change of a state of the streaming connection. In another embodiment of the invention, second identifier 235 is arranged to identify a temporary stop. An indication of a temporary stop can be a pause message.

In another embodiment of the mobile packet radio system, device 221 for measuring the length of the streaming connection is arranged to indicate a temporary break of the length of the streaming connection in response to information about the temporary break. Device 221 for measuring the length of the streaming connection is further arranged to continue the measurement of the length of the streaming connection in response to information about a restart. Device 221 for measuring the length of the streaming connection is further arranged to measure the length of the streaming connection based on the indication of a temporary break and the restart of the streaming connection.

The mobile packet radio system further includes a first checker 237 for checking whether it is possible to establish the streaming connection for the subscriber.

The mobile packet radio system further includes a second checker 239 for checking whether it is possible to utilize the time based charging for the subscriber for streaming connections in general.

The mobile packet radio system further includes a third checker 241 for checking if it is possible to utilize the time based charging for the subscriber 201 for the streaming connection.

In the aforementioned checkers, the checking is performed based on at least one of the following identifiers: a Mobile Station Integrated Service Digital Network (MSISDN) number, an International Mobile Station Identifier (IMSI) number, a client number, an identifier number or a subscriber identifier.

The mobile packet radio further includes a database 243 for storing the length of the streaming connection in one or several charging records. The storing can be performed so that the length of the streaming connection in one or several charging records is stored in relation to the subscriber.

The mobile packet radio further includes a charging generator 245 for generating a charging record which includes the length of the streaming connection in relation to subscriber 201.

Figure 3:
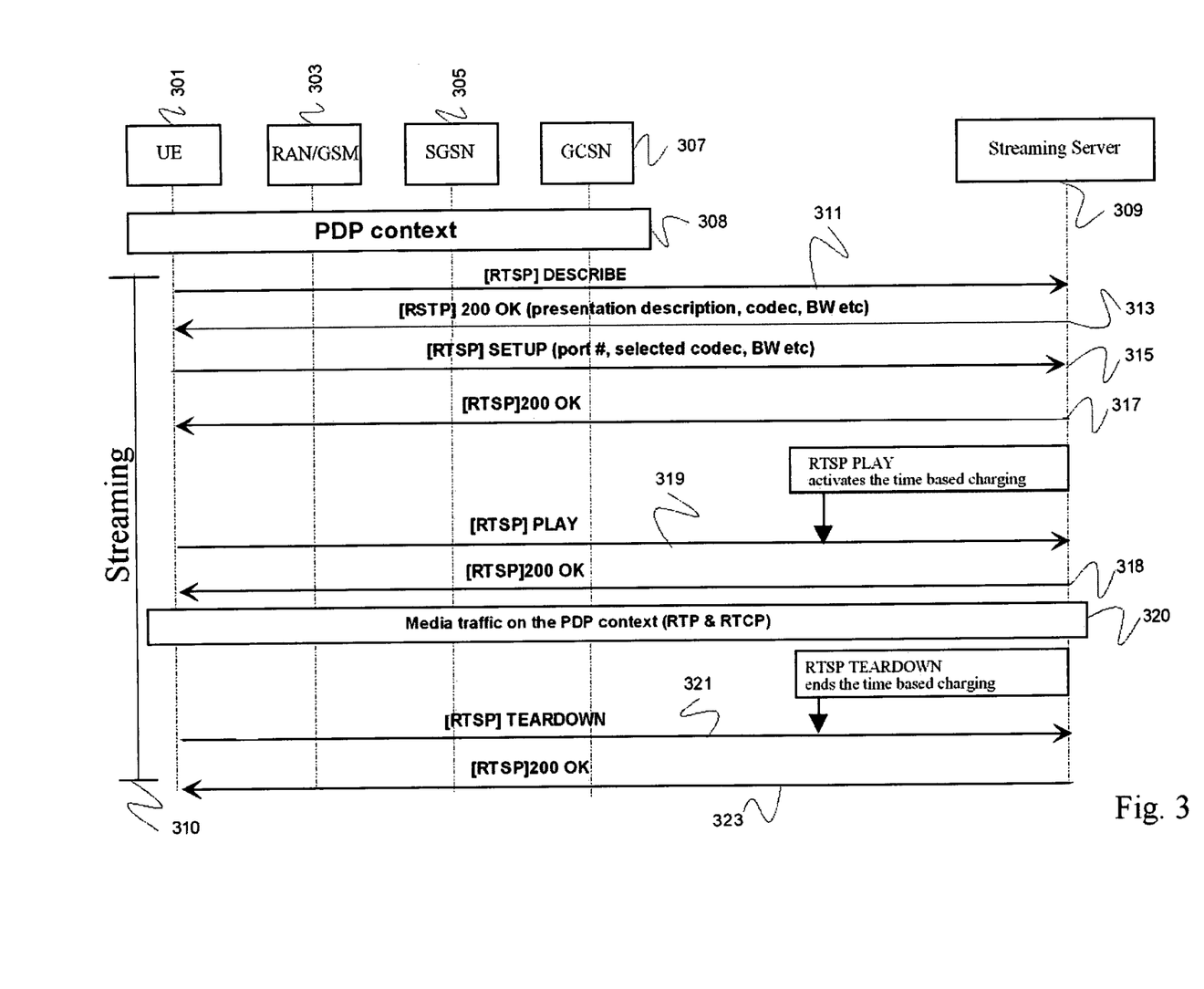
FIG. 3 shows a signalling diagram showing an example of session flows in one embodiment of the invention.

FIG. 3 shows a signalling diagram showing an example of session flows in an embodiment of this invention in accordance with RTSP protocol. In the signalling flow diagram, the network elements are described as following. User equipment UE or subscriber terminal 301 is connected with a radio access network RAN/GSM 303 and further with a serving GPRS support node SGSN 305 and a gateway GPRS support node GGSN 307. Furthermore, a streaming server 309 is shown on the signalling chart.

The method in FIG. 3 begins with the establishment of a data connection between subscriber, i.e. user equipment 301, and streaming server 309. In FIG. 3, this is noted by the establishment of PDP context 308 between user equipment 301 and GGSN 307. Between the GGSN 307 and the streaming server 309 an IP connection is established. Furthermore, in phases denoted as 310 the whole streaming connection is established in the following way. First, user equipment 301 sends a Real Time Steaming Protocol (RTSP) describe message 311 to streaming server 309. The message describes the streaming connection to be established so that streaming server 309 knows what connection is to be established between subscriber 301 and streaming server 309. After receiving the RTSP describe message 311, streaming server 309 sends an RTSP OK 313 message thereby telling user equipment 301 the presentation description, used codec and other details. Thereafter, user equipment 301 sends an RTSP SETUP 315 telling the port used, the selected codec and other details. After receiving an RTSP SETUP 315 message, streaming server 309 sends an RTSP OK message 317 signalling that streaming server 309 is ready to establish a streaming connection. Thereafter, user equipment or subscriber 301 sends an RTSP PLAY message 319 signalling that the subscriber 309 wants to immediately start the streaming connection. Therefore, RTSP PLAY message 319 activates time measurement of the streaming connection. Thereafter the streaming server 309 send a RTSP 200 OK signal acknowledging the start of the media traffic. Subsequently streaming server 309 starts media traffic 320 on the PDP context. The traffic is transmitted using RTP protocol. RTCP is used for signalling purposes. When the user equipment or subscriber 301 sends an RTSP TEARDOWN message 321 noticed by streaming server 309, the media traffic stops and the time measurement for the time based charging stops also. Thereafter, streaming server 309 sends an RTSP OK signal 323 to user equipment 301.

Figure 4:
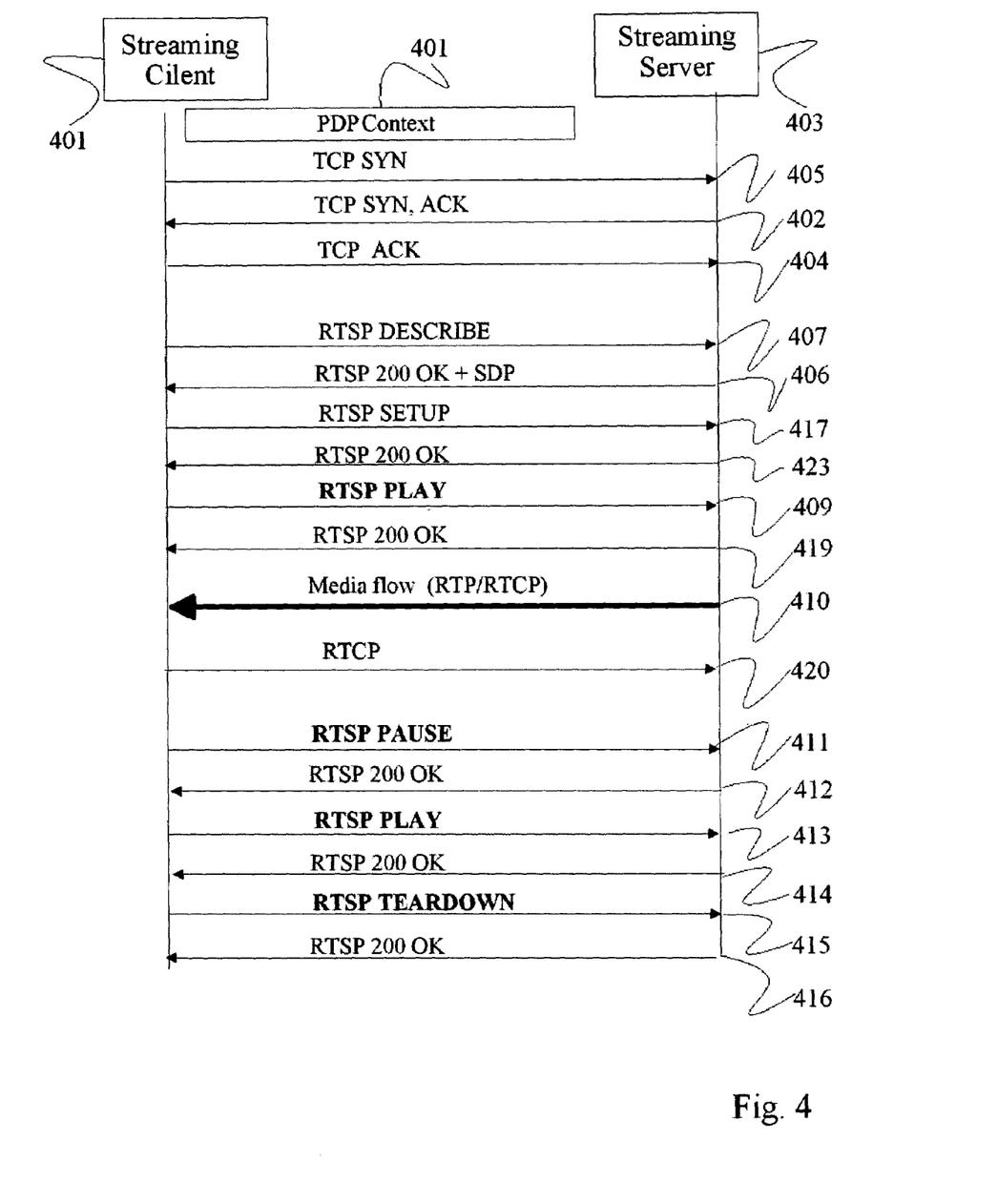
FIG. 4 shows a signalling diagram between the subscriber and the streaming server in accordance with the invention.

FIG. 4 shows a signalling diagram according to the TCP protocol and RTSP protocol disclosing the signalling relating to one embodiment of the invention between a streaming client 401, e.g. a subscriber, and a streaming server 403. First, a PDP context is established 400. Between the PDP context 400 and the streaming server 403, an IP connection is established. After that streaming client 401, i.e. subscriber 401, sends a TCP synchronization 405 message to streaming server 403. Streaming server 403 acknowledges 402 the TCP synchronization message and streaming client 401 further acknowledges 404 the first acknowledgement. After this, during the connection set up phase streaming, client 401 sends an RTSP DESCRIBE 407 message to streaming server 403. Streaming server acknowledges it with an RTSP 200 OK signal 406. In response to this, streaming client 401 sends an RTSP SETUP message 417 to streaming server 403. Thereafter, streaming server 403 sends an RTSP 200 OK signal 423 to streaming client 401. Thereafter, streaming client 401 sends an RTSP PLAY message 409 to streaming server 403. RTSP PLAY message 409 starts a timer in accordance with the invention, and thus the length of the streaming connection will be measured. Thereafter, streaming server 403 acknowledges RTSP PLAY message 405 with an RTSP 200 OK 419 message. Thereafter, streaming server 403 starts a media flow 410. The media connection and media stream from the streaming server to the streaming client have now been established and the payload can be transferred from streaming server 403 to streaming client 401. The streaming client 401 as well as the streaming source may send RTCP messages 420 to control the actual flow of bits between the streaming client and streaming source. When streaming client 401 wants to temporarily hold the streaming connection, it sends an RTSP PAUSE 411 message, which directs streaming server 403 to pause the streaming connection. It also triggers to temporarily halt the measurement of the length of the streaming connection. Streaming server 403 acknowledges RTSP PAUSE message 411 with an RTSP 200 OK message 412. When streaming client 401 wants to continue the streaming connection, it will again send an RTSP PLAY message 413 to streaming server 403. The message will again start the media flow from streaming server 403 to streaming client 401. At the same time, the measurement of the length of the streaming connection will be continued. Streaming server 403 acknowledges RTSP PLAY message 413 by sending an RTSP 200 OK message 414 to streaming client 401. Thereafter, when streaming client 401 wants the streaming connection to be end, it sends an RTSP TEARDOWN message 415 to streaming server 403, which will end and stop the streaming connection. The same RTSP TEARDOWN 415 message will also stop the measurement of the length of the streaming connection. Thereafter, streaming server 403 acknowledges RTSP TEARDOWN message 415 by sending an RTSP 200 OK 416 message to streaming client 401.

Figure 5:
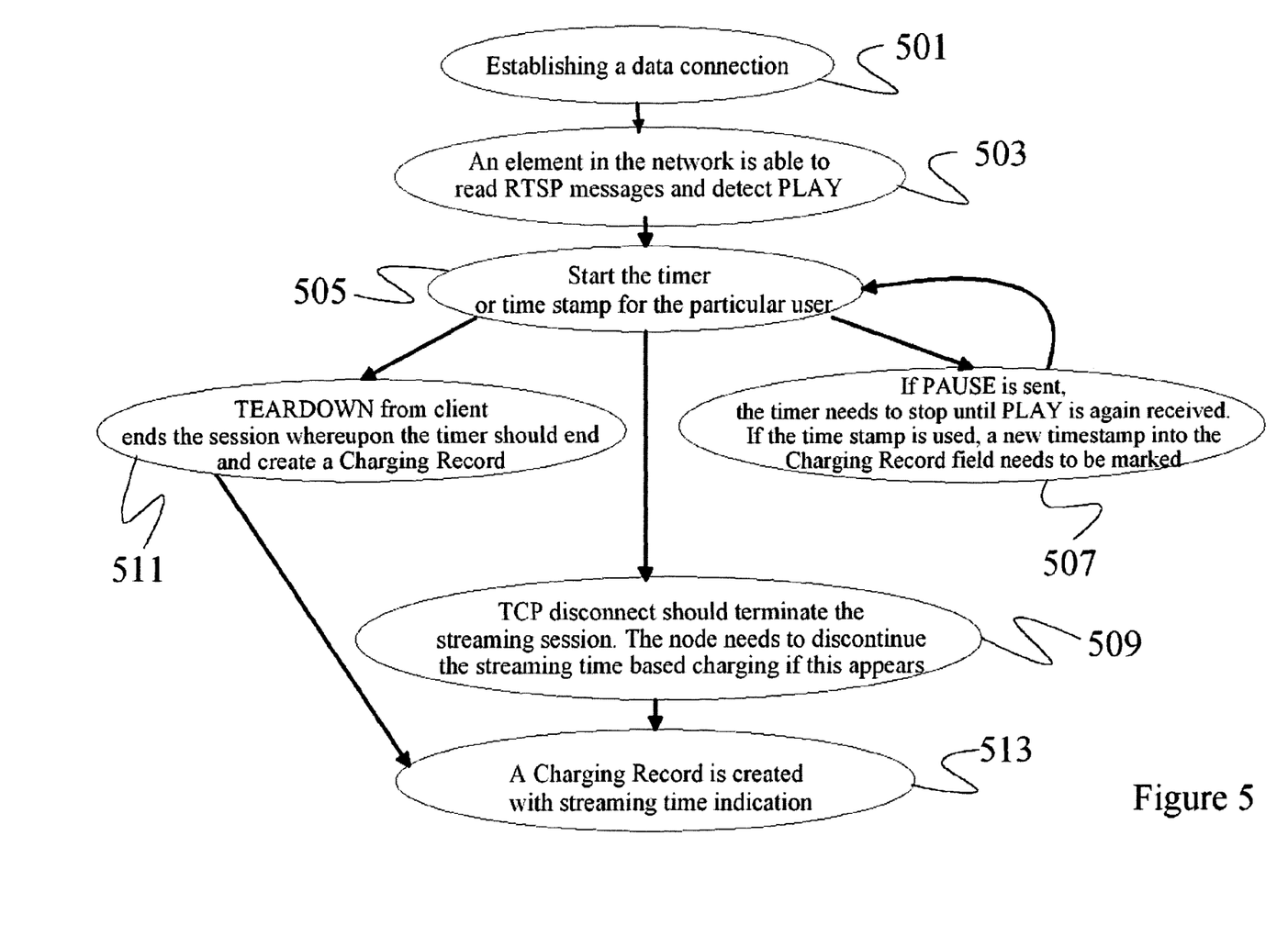
FIG. 5 shows a flow chart depicting the operation of the method and system in accordance with the invention.

FIG. 5 shows a flow chart depicting the operation of the method and system of the invention. First, in step 501 data connection between a subscriber or client and a streaming server is established 501. The data connection is e.g. a PDP context between the user equipment and the GGSN from where an IP connection to the streaming source is established. According to one embodiment it may be a prerequisite 503 that there is in the network a network element that is able to read RTSP messages and detect a possible RTSP PLAY message. If this is the case, the operation of the method will continue to phase 505 in which the timer is started or a time stamp is created in the case where a streaming connection has been established. During a session it is checked 507 whether a pause message is received, and the timer is stopped until a play message is again received, if a pause message is received. If the time stamp method is used, the time stamp indicating a pause is created in to the charging record. At any time during the session, phase 509 can be activated if a TCP disconnect message is received. Thereby, the streaming session is disconnected. The measurement of the length of the streaming connection or the measurement of the streaming time is also discontinued. At any time of the session a teardown message from the client, i.e. subscriber, can be received 511 and thereby the streaming connection or session is ended. At the same time the measurement of the length of the streaming connection will be ended, and based on the length of the streaming connection, a charging record is created 513.

For example, the method of the invention is implemented in a mobile packet radio system. The system includes a streaming source and a subscriber capable of receiving streaming data from the streaming source. In the method the streaming source can be, for example, one of the following: a streaming server, a streaming proxy, a streaming gateway, or a media server. In the method, the subscriber can be, for example, one of the following: a mobile station, a mobile terminal, a user equipment or a terminal equipment. It can also be a machine-to-machine interface of a computer or a server.

In the method the following steps are implemented. First, a data connection for the subscriber between the subscriber and the streaming source is established. Thereafter, a streaming connection is established between the subscriber and the streaming source. As earlier stated, the streaming connection is a continuous data flow transferring e.g. multimedia or video signal or content.

Regarding the step of establishing a data connection it is to be noted that the step include the idea of authorizing the subscriber for the connection. This can be performed by establishing a data context, which can be a packet data protocol context between the subscriber and the streaming source.

The establishment of the data connection can also mean the checking of access rights of a subscriber to a wireless lan network. In this embodiment, the connection is established via that network element that is implementing the time based charging. In this case, the essence of the time based charging is the measurement of the length of the streaming connection.

After the establishment of the data connection the streaming connection is terminated between the subscriber and the streaming source, and after that the streaming connection is charged using a time-based charging.

In the method the step of charging the streaming connection using a time-based charging can include, for example, the following steps: measuring the length of the streaming connection, and based on the length, generating charging information. The charging information is used to generate call data records or other information for the billing of the client or customer.

In the method, the previously mentioned step of measuring the length of the streaming connection includes a step of identifying the start and the end of the streaming connection based on a change of a state of the streaming connection. The state of the streaming connection can be for example a start, a temporary stop, a restart and an end of a session. The state of the streaming connection can be identified e.g. by receiving the signaling the network elements send and receive. In particular, one way to identify the state of the streaming connection is to identify RTSP or TCP signaling messages, which instruct the different network elements to start, stop temporarily, restart and to stop the streaming session.

It is to be noted that the length of the streaming connection is equivalent to the time of an active streaming connection. However, the length of the streaming connection can also be calculated by calculating the number of pulses generated by a pulse generator. Also, the length of the streaming connection can be measured by identifying the consecutive number of the first and the last pulse generated during the streaming connection.

Regarding the change of a state of the streaming connection, it is to be noted that according to the invention a change of a state may be equivalent to an indication of a change of a state. Thus, identifying the start and the end of the streaming connection can be performed based on a change of a state of the streaming connection.

Thus, in the method the step of measuring the length of the streaming connection includes, for example, the steps of recognizing a start of the streaming connection, starting a timer for measuring the length of the streaming connection, recognizing an end of the streaming connection, stopping the timer for measuring the length of the streaming connection, and obtaining the length of the streaming connection from the timer.

In the method the step of recognizing the start includes the step of recognizing a play message. The play message is an RTSP signaling message instructing the start of the streaming connection.

In another embodiment of the invention the step of recognizing the end of the streaming connection includes the step of recognizing a teardown message or a disconnect message.

In another embodiment of the invention the step of measuring the length of the streaming connection includes the steps of: generating time stamps based on messages sent by the subscriber, and based on the time stamps, calculating the length of the streaming connection.

In another embodiment of the invention the method includes the steps of: recognizing a start of the streaming connection, creating a first time stamp indicating the start time of the streaming connection, recognizing the end of the streaming connection, creating a second time stamp indicating the end of the streaming connection, and calculating the length of the streaming connection based on the first and the second time stamps.

In another embodiment of the invention the step of recognizing the start of the streaming connection includes the step of recognizing a play message. This play message can be for example a RTSP-play message.

In another embodiment of the invention the step of recognizing the end of the streaming connection includes the step of recognizing a teardown message or a disconnect message. The teardown message can be e.g. a RTSP message. The disconnect message can be e.g. a TCP message.

In another embodiment of the invention the step of measuring the length of the streaming connection includes the step of identifying a temporary stop of the streaming connection based on a change of a state of the streaming connection. The identifying can be accomplished by identifying a temporary stop or a respective message. The message can be a pause message, that is sent e.g. in accordance with the RTSP standard.

In another embodiment of the invention the step of measuring the length of the streaming connection includes, for example, the following steps: sending information about a temporary stop of the streaming connection, based on the information about the temporary stop, halting temporarily the measurement of the length of the streaming connection, sending information about a restart of the streaming connection, based on the information about the restart restarting the measurement of the length of the streaming connection, and measuring the length of the streaming connection based on the halting and restarting of the measurement of the length of the streaming connection.

In another embodiment of the invention the method includes the step of checking whether it is possible to establish a streaming connection for the subscriber. The check is done e.g. from a database. The database can be a Home Location Register (HLR) or any other database containing client data.

In another embodiment of the invention the method includes the step of checking whether it is possible to use the time based charging for the subscriber for streaming connections in general. The check is done e.g. in a database.

In another embodiment of the invention the method includes the step of checking whether it is possible to use the time based charging for the subscriber for the streaming connection. The check is performed e.g. in a database. The database can be an HLR or any other database containing client data.

In all off the aforementioned checkings the checking is performed based on at least one of the following identifiers: a MSISDN number, an IMSI number, a client number, an identifier number, and a subscriber identifier.

In another embodiment of the invention the method includes the step of storing the length of the streaming connection in one or several charging records. Storing can be performed so that the stored records relate to the subscriber or to the equipment of the subscriber or to the client.

In another embodiment of the invention the method includes the step of generating a charging record including the length of the streaming connection in relation to the subscriber.

It is obvious to one skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
  establishing a mobile packet data connection for a subscriber;
  establishing, over said established mobile packet data connection, a streaming connection comprising a continuous media stream configured for real-time playback between said subscriber and a streaming source;
  terminating the streaming connection between said subscriber and said streaming source;

measuring a duration of said continuous media stream; and charging said streaming connection based on said measured duration of said continuous media stream;

wherein said measuring the duration of said continuous media stream further comprises:

sending temporary stop information about a temporary stop of said continuous media stream, based on said temporary stop information, halting temporarily the measuring of said duration of said continuous media stream, sending restart information about a restart of said continuous media stream, based on said restart information, restarting the measuring of said duration of said continuous media stream, and measuring the duration of said continuous media stream based on said temporarily halting and restarting of the measuring of said duration of said continuous media stream.

2. A mobile packet radio system, comprising:

a streaming source;

a subscriber configured to receive streaming data from said streaming source;

a first establishment unit configured to establish a mobile packet data connection for said subscriber;

a second establishment unit configured to establish, over said established mobile packet data connection, a streaming connection comprising a continuous media stream configured for real-time playback between said subscriber and said streaming source;

a termination unit configured to terminate said streaming connection between said subscriber and said streaming source;

a measurement unit configured to measure a duration of said continuous media stream; and a charger configured to charge said streaming connection based on said measured duration of said continuous media stream;

wherein said measurement unit comprises:

a first identifier configured to identify a start and an end of said continuous media stream based on a change of a state of said continuous media stream; and a second identifier configured to identify a temporary stop of said continuous media stream in response to a change of a state of said continuous media stream and wherein said measurement unit is configured to indicate a temporary break of said duration of said continuous media stream in response to temporary stop information about said temporary stop;

to continue the measurement of said duration of said continuous media stream in response to restart information about a restart; and to measure the duration of said continuous media stream based on said indication of the temporary break and said restart of the measurement of the duration of said continuous media stream.

* * * * *